No. 638,168. Patented Nov. 28, 1899.
A. W. BESSEY.
HEATING APPARATUS FOR INCUBATORS.
(Application filed Jan. 6, 1899.)
(No Model.)

Witnesses
J. L. Edwards Jr.
J. F. Riley

A. W. Bessey Inventor
By his Attorneys,
C. A. Snow & Co.

UNITED STATES PATENT OFFICE.

ALBERT W. BESSEY, OF ORANGE, CALIFORNIA.

HEATING APPARATUS FOR INCUBATORS.

SPECIFICATION forming part of Letters Patent No. 638,168, dated November 28, 1899.

Application filed January 6, 1899. Serial No. 701,340. (No model.)

*To all whom it may concern:*

Be it known that I, ALBERT W. BESSEY, a citizen of the United States, residing at Orange, in the county of Orange and State of California, have invented a new and useful Heating Apparatus for Incubators, of which the following is a specification.

The invention relates to improvements in heating apparatus for incubators.

The object of the present invention is to improve the construction of heating apparatus for incubators and to provide simple and efficient means for controlling the draft and to enable the eggs to be subjected more thoroughly and uniformly to the action of the heat.

The invention consists in the construction and novel combination and arrangemement of parts, hereinafter fully described, illustrated in the accompanying drawings, and pointed out in the claims hereto appended.

Figure 1:
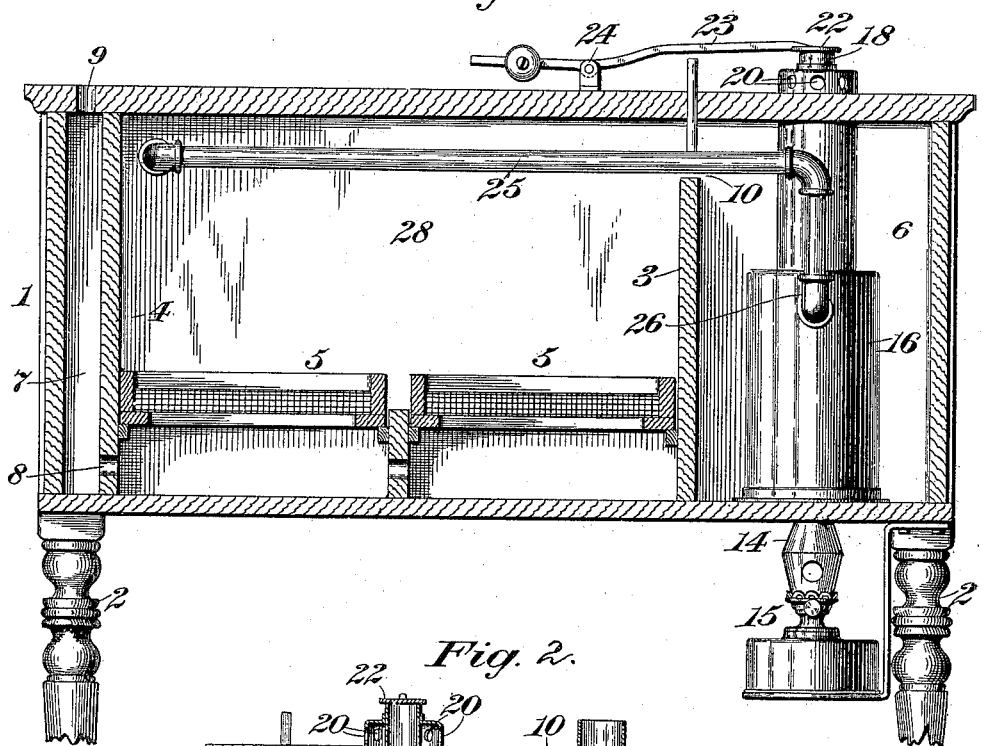
Figure 2:
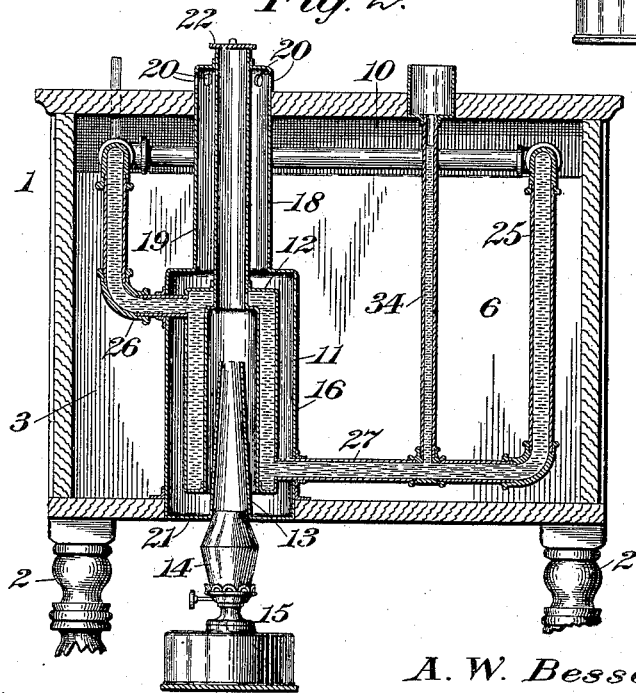

In the drawings, Figure 1 is a longitudinal sectional view of an incubator provided with a heating apparatus constructed in accordance with this invention. Fig. 2 is a transverse sectional view.

Like numerals of reference designate corresponding parts in both figures of the drawings.

1 designates a casing rectangular in cross-section and supported by suitable legs 2 and provided near its ends with vertical partitions 3 and 4, forming an intermediate chamber or compartment for the reception of trays 5. The partition 3, which extends from the bottom of the casing to within a short distance from the top, forms an end compartment 6 for the reception of the heating apparatus, and it provides a space between its upper edge and the top of the casing for the passage of hot-water pipes and hot air. The partition 4, which is located near the other end of the casing, forms a narrow air-passage 7, and openings or ducts 8 and 9 are provided and are located, respectively, near the lower edge of the partition 4 and the top of the casing, so that air passing through the space 10 will descend through the tray and escape beneath the same by way of the openings 8.

The heating apparatus consists of a cylindrical boiler 11, composed of cylindrical inner and outer walls and having a contracted upper end 12, and the space inclosed by the inner wall or shell of the boiler is entirely open at the bottom and receives a cone 13. The cone 13, which is adapted to receive the chimney 14 of a lamp 15 or other suitable heating device, such as a gas-jet, extends a short distance below the boiler and is connected with an outer casing 16, conforming to the configuration of the boiler or reservoir and to a smoke pipe or flue 18, extending upward from the contracted portion of the boiler. The upper portion of the outer casing or jacket is contracted around the flue 18, and its upper end, which is closed directly above the intervening space 19, is provided with an annular series of openings 20. The lower end of the jacket or casing is provided with a horizontal flange or ring 21, which is united to the base of the cone 13.

The bottom of the jacket is mounted within an opening of the bottom of the casing, and the upper portion of the jacket extends through the top of the same, the openings 20 being located above the casing. The flue 18, which extends above the jacket, is adapted to be opened and closed to regulate the draft and the heating power of the apparatus, and this is effected by means of a valve or cover 22, mounted on a lever 23, which is fulcrumed between its ends on a suitable support 24 and which may be held in a position for opening the flue by any suitable means, the cover or valve being preferably maintained in its closed position by gravity.

When the valve is open, the heat passes upward from the cone 13 to the flue 18 and out at the top thereof, and this direct draft draws in the cool air through the openings 20, causing the same to pass downward through the intervening space between the outer casing or jacket and the flue and boiler and upward at the inner side of the boiler between the same and the cone 13, which forms an inner jacket. By passing the cool air around the inner and outer sides of the boiler the heating power of the lamp is modified and a moderate temperature of the water within the boiler is produced; but when it is desired to obtain the maximum heating effect of the device the valve 22 is closed and the heat after leaving the top of the cone or inner jacket impinges against the inner wall or shell of the boiler, passes around the bottom and then upward at the outside of the same, thereby heating both the inner and outer surfaces of the cylindrical boiler. The heat collects in the flue 18, and a maximum effect is obtained from the lamp or other source of heat employed.

The water is supplied to the apparatus by means of a filling or supply tube 34, communicating with the return portion of the distributing or circulating pipe 25 and provided at its upper end with a cup or enlargement to enable water to be poured into it readily.

The invention has the following advantages: The heating apparatus by causing the heat to impinge against the inner and outer faces of the cylindrical boiler produces the greatest heating effect, and the water, by being distributed in a thin cylindrical sheet, is more thoroughly operated on and more quickly heated than if it were arranged in a compact body; also, by controlling the passage of the heat through the apparatus a maximum heating effect may be produced or a moderate heat may be obtained.

Changes in the form, proportion, and minor details of construction may be resorted to without departing from the spirit or sacrificing any of the advantages of this invention.

What is claimed is—

1. In an incubator, a heating apparatus comprising a boiler having inner and outer shells adapted to hold the water in a thin sheet, a flue extending from the top of the boiler and communicating with the space inclosed by the inner shell to form a direct passage for the heat, an outer jacket spaced from the boiler, an inner jacket connected with the lower end of the outer jacket and extending upward into the space inclosed by the inner shell and terminating short of the said flue, and means for governing the flow of the products of combustion through the flue, substantially as described.

2. In an incubator, a heating apparatus comprising a boiler having inner and outer walls and adapted to arrange the water in a thin sheet, a flue extending upward from the boiler, inner and outer jackets connected at the bottom and providing intervening spaces between them and the inner and outer faces of the boiler, the inner jacket terminating short of the top of the boiler and the outer jacket extending upward around the flue, and means for opening and closing the flue, whereby hot air may be caused to impinge against the inner and outer faces of the boiler or to pass directly through the flue, substantially as and for the purpose described.

3. In an incubator, a heating apparatus comprising a boiler having inner and outer shells or walls to distribute the water in a thin sheet, a flue extending from the top of the boiler, an outer jacket spaced from the boiler and the flue and provided at its top with openings, an inner jacket connected with the lower end of the outer jacket, and a valve for opening and closing the flue, substantially as described.

4. In an incubator, a heating apparatus comprising a hollow cylindrical boiler having a reduced upper end, a flue extending from the contracted portion of the boiler, an outer jacket spaced from the boiler and the flue and having an opening at its upper end, an inner cone or jacket connected with the lower end of the outer jacket and adapted to receive a heating device, and a valve for opening and closing the flue, substantially as described.

In testimony that I claim the foregoing as my own I have hereto affixed my signature in the presence of two witnesses.

ALBERT W. BESSEY.

Witnesses:
THOMAS WALMSLEY,
W. H. H. CLAYTON.